(12) United States Patent
Truax

(10) Patent No.: US 12,086,839 B2
(45) Date of Patent: *Sep. 10, 2024

(54) MEDIA SOURCE VALIDATION AND EMBEDDED IDENTIFICATION

(71) Applicant: Chris Truax, La Mesa, CA (US)

(72) Inventor: Chris Truax, La Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,014

(22) Filed: Oct. 3, 2022

(65) Prior Publication Data

US 2023/0030942 A1 Feb. 2, 2023

Related U.S. Application Data

(63) Continuation of application No. 17/341,013, filed on Jun. 7, 2021, now Pat. No. 11,461,813.

(51) Int. Cl.
*G06Q 30/0241* (2023.01)
*G06F 16/41* (2019.01)
*H04L 67/30* (2022.01)

(52) U.S. Cl.
CPC ......... *G06Q 30/0276* (2013.01); *G06F 16/41* (2019.01); *H04L 67/30* (2013.01)

(58) Field of Classification Search
CPC .................................................. G06Q 30/0276
See application file for complete search history.

(56) References Cited

U.S. PATENT DOCUMENTS

| | | | |
|---|---|---|---|
| 2006/0026162 A1* | 2/2006 | Salmonsen | G06F 16/44 |
| 2018/0060921 A1* | 3/2018 | Mengle | G06Q 30/0276 |
| 2021/0150541 A1* | 5/2021 | Gurbuxani | G06Q 30/0242 |
| 2021/0281928 A1* | 9/2021 | Boskovich | G06V 20/64 |

* cited by examiner

*Primary Examiner* — Azam A Ansari
(74) *Attorney, Agent, or Firm* — Genius Patent APC; Bruce Angus Hare

(57) ABSTRACT

Ways to associate source information with a media item are described. Source information may be validated. A media sourcing engine may receive a selected media item, collect source information associated with the selected media item, and associate the source information with the selected media item. The media source engine may be associated with, or otherwise utilized by, various publication platforms, such as social media sites, content hosting sites, etc. Source information may be associated with a media item by generating augmented media content that may be added to, embedded into, and/or otherwise associated with content associated with a received media item.

19 Claims, 11 Drawing Sheets

MEDIA SOURCE VALIDATION AND EMBEDDED IDENTIFICATION

CROSS-REFERENCE TO RELATED APPLICATIONS

This application is a continuation of U.S. patent application Ser. No. 17/341,013, filed on Jun. 7, 2021.

BACKGROUND

Various jurisdictions (e.g., national, state, local, etc.) may enforce various regulations regarding distribution of certain types of media content (e.g., political advertising).

Therefore, there exists a need for a way to validate source information and embed the validated source information into a media content item.

BRIEF DESCRIPTION OF THE SEVERAL VIEWS OF THE DRAWING

The novel features of the disclosure are set forth in the appended claims. However, for purpose of explanation, several embodiments are illustrated in the following drawings.

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide ways to validate media item source information and associate the validated source information with the media item. A media sourcing engine of some embodiments may receive a selected media item, validate source information associated with the selected media item, and associate the validated source information with the selected media item. The media source engine may be associated with, or otherwise utilized by, various publication platforms, such as social media sites, content hosting sites, etc.

Validated source information may be associated with a media item by generating augmented media content that may be added to, embedded into, and/or otherwise associated with content associated with a received media item.

Although many examples herein may refer to "source" or "sourcing" information, "validation" information, and/or other specified examples of augmented information or content, one of ordinary skill in the art will recognize that various other types of information and/or content may be associated with an augmented media item by generating augmented media content and/or other information to include with the augmented media item. For instance, upload date or publication date information may be associated with the augmented media item.

Figure 1:
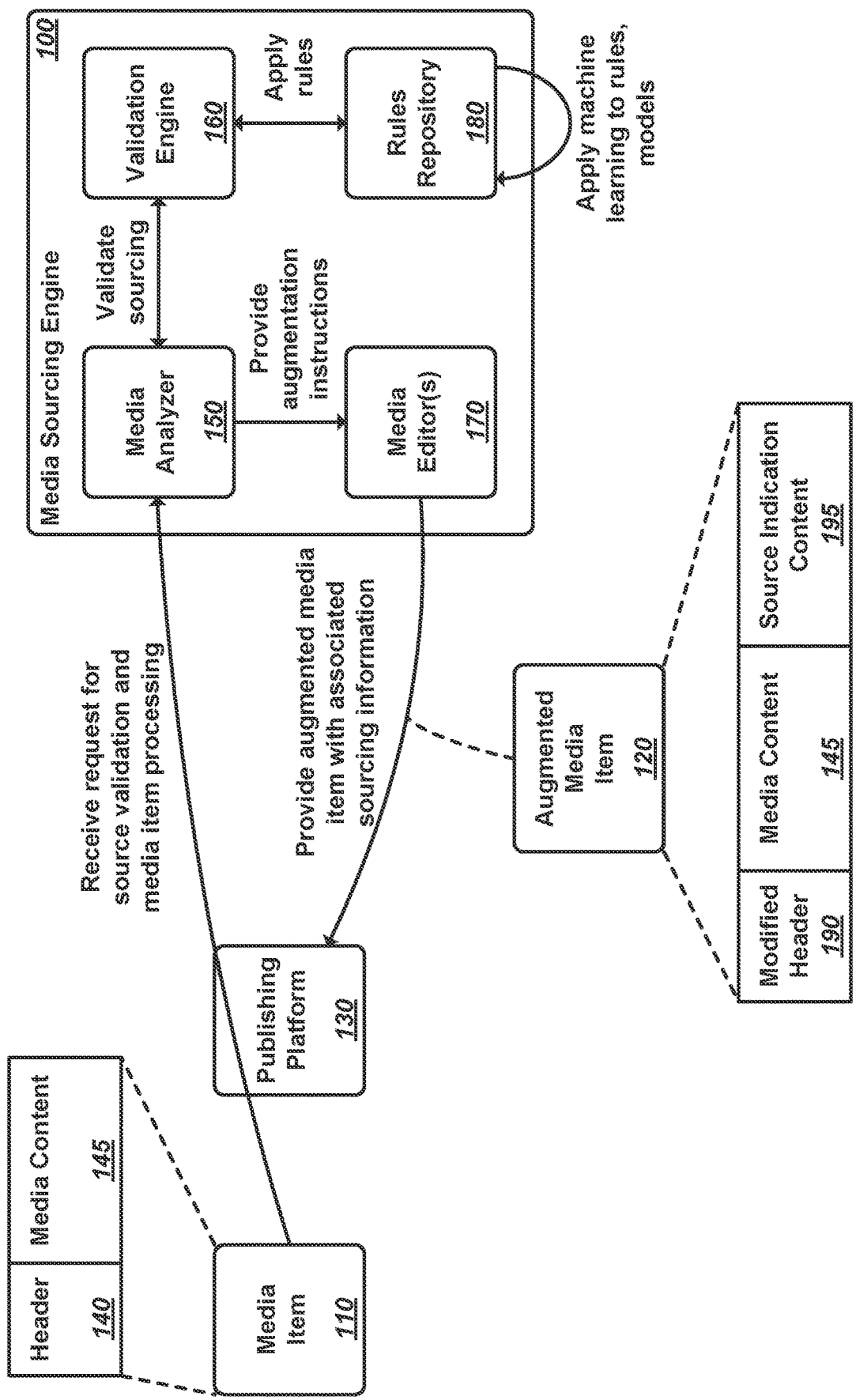
FIG. 1 illustrates an example overview of one or more embodiments described herein, in which a media sourcing engine validates source information of a media item and associates the validated information with the media item.

FIG. 1 illustrates an example overview of one or more embodiments described herein, in which a media sourcing engine 100 validates source information of a media item 110 and associates the validated information with an augmented media item 120. As shown, a request for source validation and media item processing may be received by the media sourcing engine 100 from a publishing platform 130. Such a request may include the media item 110 and/or identifying information associated with the media item (e.g., a file name or other identifier, address such as a uniform resource locator (URL), etc.) and/or other relevant information such as identifying information related to the publishing platform 130, associated user(s), etc.

The media item 110 may include various types of media content (e.g., text, graphics, photographs, video, audio, etc.) and may be associated with various different file types, numbers of files, and/or other appropriate storage attributes. The media item 110 (and/or associated request for publication) may be received from various appropriate sources across various appropriate channels. For instance, the media item 110 may be received from a resource such as a user device and/or other user equipment (e.g., a smartphone, tablet, laptop, personal computer, wearable device, etc.) via a network-based communication channel. As another example, the media item 110 may be received from a resource such as a content server via an application programming interface (API).

In some embodiments, publishing platform 130 (and/or other appropriate resources) may provide a set of approved media items for selection by users. For instance, a set of approved political advertisements may be provided for selection by users of a social media site.

In this example, media item 110 may be an audiovisual media file such as an advertisement. A social media site may serve as the publishing platform 130. A user of the site may submit a request to publish the media item 110 and/or otherwise initiate publication of the media item 110 (e.g., by uploading the media item 110 to a resource such as a public forum, group page, personal page, etc.).

Media item 110 may include a header 140, media content 145, and/or other components. The header 140 may include information and/or metadata such as file name, type, size, author, title, etc. In some embodiments, the header 140 may include information related to content attributes, such a resolution, video speed, audio type, start time, stop time, scene or other markers or delimiters, etc. The media content 145 may include data associated with various types of media content, such as photographs, graphic content, text, video, audio, and/or combinations of such media content (e.g., data associated a video that includes audio and overlaid graphics and text).

Publishing platform 130 may be a network-accessible resource associated with provision of multimedia content. Examples of such platforms include social media sites and/or other web sites, communication or messaging platforms, email services, internet service providers (ISPs), private networks (e.g., a corporate intranet), streaming services, etc. The publishing platform 130 may be implemented using various systems or devices, such as servers, storages, network interfaces, etc.

In this example, publishing platform 130 may be a social media site, and media item 110 may be an audiovisual clip showing a political advertisement that is uploaded (or otherwise received) from a user of the social media site.

Media sourcing engine 100 may be implemented using various devices and/or components, such as servers, storages, network interfaces, etc. In some embodiments, the media sourcing engine 100 may be at least partly implemented by, at, and/or via the publishing platform 130 (e.g., as an application or service running on the publishing platform 130). In this example, media sourcing engine 100 includes a media analyzer 150, validation engine 160, one or more media editors 170, and a rules repository 180.

The media sourcing engine 100 may receive the request from a publishing platform 130 or other appropriate resource. The augmented media item 120 may be returned to the publishing platform 130 and/or provided to other resources, such as a different requestor, a media server, etc. The augmented media item 120 and/or identifying information associated with the media item (e.g., a file name or other identifier, address such as a URL, etc.) and/or other relevant information such as identifying information related to the publishing platform 130, associated user(s), etc. may be provided to the publishing platform 130 and/or other appropriate resource via a notification or response message and/or via other appropriate ways (e.g., by adding the augmented media item 120 to a storage or server accessible via API).

Media analyzer 150 may analyze and/or process the received media item 110. The media analyzer 150 may communicate with other components of media sourcing engine 100 and/or at least partly control or direct such other components. The media analyzer 150 may analyze the received media item 110 to determine relevant attributes associated with the media item, such as media type, file type, video resolution, video speed, audio type, audio resolution, start time, stop time, scene or other markers or delimiters, etc. Media analyzer 150 may analyze media content 145, header information 140, and/or other information associated with media item 110 (e.g., publisher, file name, etc.).

The media analyzer 150 may send a request for source validation to the validation engine 160. The request for source validation received from publishing platform 130 may include information such as username, platform, etc. In addition, identifying information such as internet protocol (IP) address of the requestor may be received or determined. The validation engine 160 may receive the request for source validation from the media analyzer 150 and, based on analysis of the request, identify and apply rules stored at rules repository 180.

The rules repository 180 may include various validation rules and/or other rules associated with validation and/or publication of content. For instance, a particular publishing platform 130 such as a social media site may have a set of rules associated with user verification or validation (e.g., by requiring a username and/or password to match stored values, by evaluating a key or token provided via publishing platform 130, etc.). As another example, various sets of rules may be associated with various jurisdictions, regulatory agencies, and/or other parties that may enforce rules associated with publication of content (e.g., campaign finance laws requiring indication of sourcing information, disclosure of funding sources, association of a candidate to a political advertisement, etc.).

The rules repository 180 may apply various machine learning algorithms to the various rules or models associated with the rules repository 180. Such machine learning may be based upon various types of feedback and/or other inputs. For instance, a human reviewer may indicate whether sourcing information appeared correct, whether the content was clear and comprehensible, whether any rules were incorrectly enforced or applied, whether relevant sourcing requirements were met, etc.

The validation engine 160 and/or rules repository 180 may identify relevant rules. In some embodiments, the media analyzer 150 and/or validation engine 160 may analyze received content to match the content to known or supported content items. For instance, a political advertisement may be uploaded by a user and the content may be analyzed and matched to content associated with a site or resource that is associated with a political action committee (PAC), publisher (e.g., a news or media company), and/or other content generator or provider.

The validation engine 160 may apply validation rules and provide a validation response message indicating whether the sourcing has been validated and/or meets any applicable requirements (e.g., if validation is not required the validation message may indicate that no validation was necessary). The validation engine 160 may utilize various validation resources in addition to, or in place of, rules repository 180. For instance, username and/or password information may be sent to a third-party resource for validation or verification. As another example, if an email address is provided, a verification message may be sent to the email address for further action. As still another example, matching requests may be sent to various content servers or other content providers. As yet another example, credit card information (e.g., card number and billing address) may be collected and validated through a payment processing resource. In some embodiments, the validation engine 160 and/or rules repository 180 may store, catalog, or otherwise maintain a database of content elements that may be used for matching or analysis.

In some embodiments, validated sourcing information may include a chain of sources related to a content item. For instance, source information may indicate that a political advertisement was generated by a particular PAC and uploaded to a particular social media site by a particular user. Additional sourcing information may be appended, for example, if the content item is subsequently published or shared to another social media site by another user. The validation response message may include a set of rules to be enforced or applied by media analyzer 150 (e.g., rules regarding content, sourcing, etc. that are applied by modifying the received media item 110).

The media analyzer 150 may receive the validation response message and, if the message indicates that the source is not able to be validated, may respond to the request from the publishing platform 130 with a rejection message or other indication of failure to validate the source information.

If the validation response message indicates that the sourcing is valid (or that source validation is not necessary), the media analyzer 150 may apply relevant received rules to processing of the received media item 110. Continuing the political advertisement example, the set of rules may include a requirement that source information be provided via the political advertisement. Rules may be associated with various media editing or generating operations. For instance, a rule may indicate that source information for an audiovisual file should be provided via appended audiovisual content.

The media analyzer 150 may provide augmentation instructions to the media editor(s) 170. The augmentation instructions may include information related to media item 110, such as header 140 and/or media content 145. The augmentation instructions may include source information (e.g., source name, publishing resource, etc.), source validation information (e.g., IP address, user device identifying information, etc.), and/or associated sourcing rules.

Media editor(s) 170 may implement the received augmentation instructions to generate the augmented media item 120. The augmented media item 120 may include a modified header 190, media content 145, source indication content 195, and/or other content or information (e.g., metadata, header 140, etc.). The source indication content 195, and/or other augmented content, may be merged with media content 145 in some embodiments. Source indication content 195 may generally be minimized relative to the media content 145. For example, if an advertisement is thirty seconds long, the source indication content 195 may be limited to two seconds or five seconds.

In some embodiments, modified header 190 and/or source indication content 195 may include cryptographic data such as blockchain data. Such cryptographic data may allow augmented media item 120 to serve as a non-fungible token (NFT). The cryptographic data may be generated in various appropriate ways and embedded into the modified header 190 or otherwise be appropriately associated with augmented media item 120.

Continuing the above example, validated source information for the political advertisement (e.g., publishing platform 130, username or identifying information (e.g., personal information such as name, affiliations, etc.), publication time, original source (if known), etc.) may be received by media editors 170 and used to generate audiovisual content indicating the validated sourcing information. For instance, text-based sourcing information may be converted to audio content (e.g., "text-to-speech") that is appended to the end of augmented media item 120. Such conversion may include modifying or augmenting the received source information. For instance, if the name of an individual is received (e.g., "Bob Smith"), the name may be added to a standard text phrase (e.g., "content uploaded by"). As another example, graphical sourcing information may be overlaid onto the media content 145. As another example, video content may be generated to match the audio content (e.g., an avatar or simulated entity such as a virtual newsreader or celebrity).

The augmented media item 120 may be returned to the publishing platform 130 and/or provided to other resources, such as a different requestor, a media server, etc. The media sourcing engine 100 may provide associated sourcing information and/or source validation information (e.g., validation resource(s), rules applied, etc.) with the augmented media item 120. In some embodiments, the augmented media item 120 may be tagged or otherwise indicate that sourcing information has been appended. Thus, for instance, a user may be able to submit a media item 110 to media sourcing engine 100 and receive an augmented media item 120 that is tagged or otherwise indicates that the augmented media item 120 is ready for publication. Such tagging may be associated with a set of publishing resources, such as a set of social media sites or content hosting resources, such that a user may generate one augmented media item 120 that may then be distributed to the various resources.

One of ordinary skill in the art will recognize that although various examples in this disclosure may refer to specific types of content and analysis (e.g., political advertisements and source validation), different embodiments may be associated with various different types of content and/or analysis. For instance, some embodiments may analyze received content to determine if the content is suitable for viewing by children and automatically generate and insert a warning if the content is not suitable.

Figure 2:
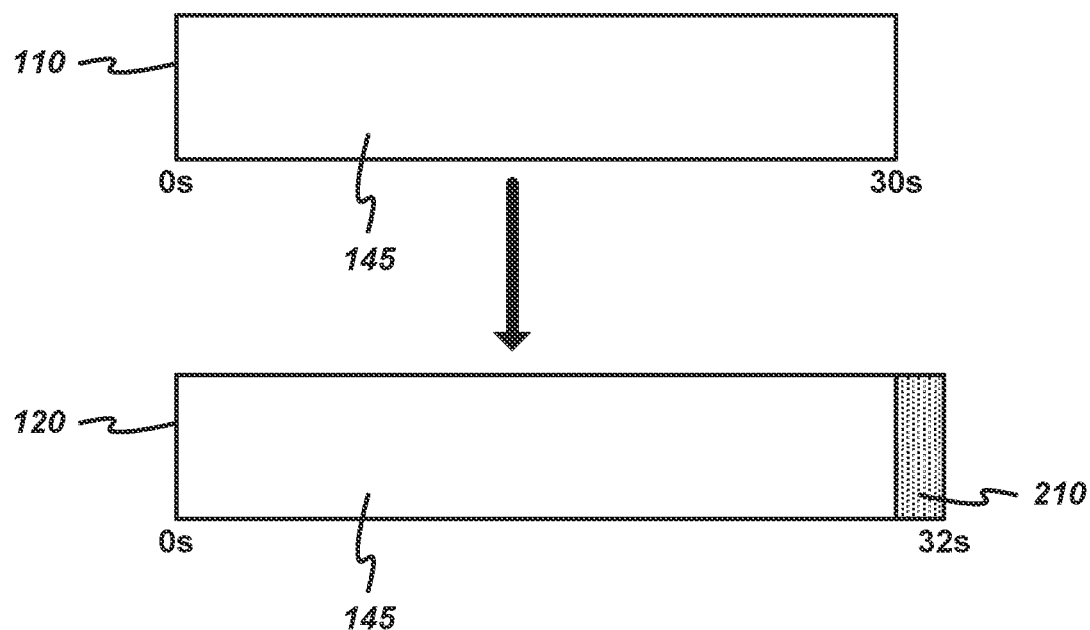
FIG. 2 illustrates an example overview of one or more embodiments described herein, in which media source information is associated with a media item by embedding a media clip.

FIG. 2 illustrates an example overview of one or more embodiments described herein, in which media source information is associated with a media item 110 by embedding a media clip 210 that includes source indication content 195. In this example, the media clip 210 is added to the end of media content 145. Different embodiments may include the media clip 210 at various locations relative to media content 145 (e.g., inserted before the content, inserted in the middle of the content, etc.). In this example, the media content 145 may be thirty seconds long, while the appended clip 210 is two seconds. Different embodiments may implement various rules or limitations related to size or length of the clip 210 relative to the size or length of the media content 145. The media clip 210 may include various media types, such as video, audio, graphics, etc.

Figure 3:
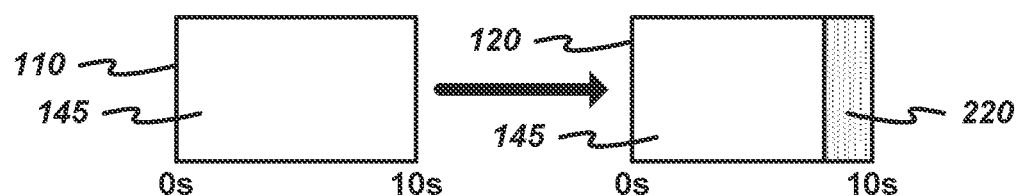
FIG. 3 illustrates an example overview of one or more embodiments described herein, in which media source information is associated with a media item by overlaying the information onto a media clip.

FIG. 3 illustrates an example overview of one or more embodiments described herein, in which media source information is associated with a media item 110 by overlaying media content 220 that includes source indication content 195 onto the media content 145. For instance, text-based graphics or subtitles may be generated and rendered onto an audiovisual clip 110. The media content 220 may be added to the media content at various locations, based on various relevant factors. For example, audio content 220 may be generated and overlaid onto a portion of the media content 145 that is determined to have no sound (or only background music). As another example, text-based graphics may be inserted onto video content that is determined to have a homogeneous background.

Figure 4:
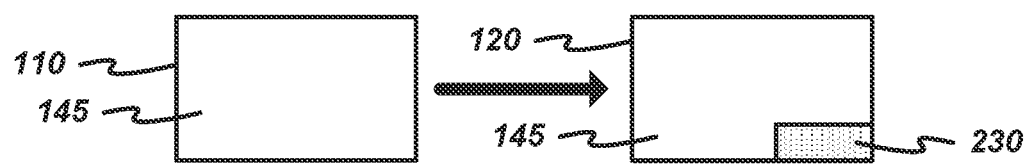
FIG. 4 illustrates an example overview of one or more embodiments described herein, in which media source information is associated with a media item by overlaying the information onto an image.

FIG. 4 illustrates an example overview of one or more embodiments described herein, in which media source information is associated with a media item 110 by overlaying the source indication information 230 onto an image 145. In this example, media item 110 may include a single frame or image 145 and the source indication information 230 is overlaid onto the bottom right corner of the image 145. The source indication information 230 may be overlayed at a location determined to meet various criteria. For instance, the image 145 may be analyzed to identify regions with solid or homogeneous backgrounds, colors may be analyzed to determine locations with potential for high contrast, etc.

Figure 5:
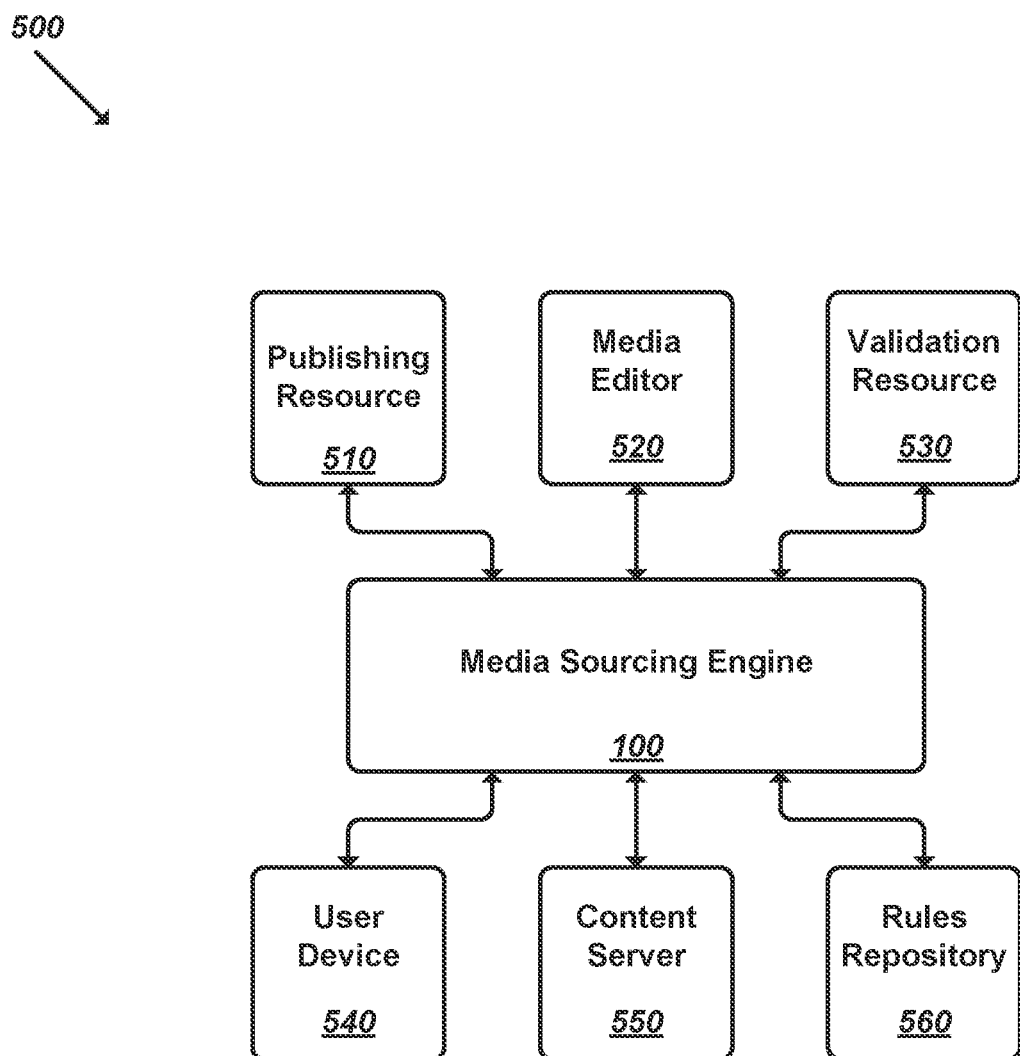
FIG. 5 illustrates a schematic block diagram of an environment associated with one or more embodiments described herein.

FIG. 5 illustrates a schematic block diagram of an environment 500 associated with one or more embodiments described herein. As shown, the environment may include a media sourcing engine 100, a publishing resource 510, a media editor 520, a validation resource 530, a user device 540, a content server 550, and a rules repository 560. Environment 500 may be implemented using various devices and/or sets of devices and may be implemented using various networks or other communication pathways.

Publishing resource 510 may include various servers, storages, etc. that may be associated with one or more publishing platforms 130. Such publishing resources 510 may be able to communicate across, or be accessible via, various network communication pathways. In some embodiments, publishing resource 510 may implement and/or include various other elements of environment 500, such as media sourcing engine 100, media editor 520, validation resource 530, content server 550, and/or rules repository 560.

Media editor 520 may include various servers, APIs, etc., that may provide media editing capabilities. Media editor 520 may be accessible across one or more networks or other appropriate communication pathways. In some embodiments, media editor 520 may be implemented by, and/or included at, media sourcing engine 100.

Validation resource 530 may include various servers, APIs, storages, etc. that may provide source validation. Such resources may include, for instance, social media resources, email account resources, and/or payment processing resources (e.g., credit card processing services).

User device 540 may be any device or component that is able to interact with the media sourcing engine 100 or the publishing resource 510. Examples of user devices 540 include smart phones, tablets, personal computers, laptops, wearable devices, embedded devices, etc.

Content server 550 may include various servers, APIs, storages, etc. that may provide or store media content. Such content servers 550 may be associated with various resources, such as media hosting sites, social media sites, publishing platforms 130, and/or other appropriate resources.

Rules repository 560 may include various servers, storages, etc. that may store and provide rules for use by the media sourcing engine 100 and/or other system components, such as validation resources 530.

As described above, in some embodiments, media sourcing engine 100 may implement or include elements such as media editor 520, validation resource 530, content server 550, and/or rules repository 560.

One of ordinary skill in the art will recognize that environment 500 may be implemented in various different ways without departing from the scope of the disclosure. For instance, various additional components may be included, or some listed components may be omitted in some embodiments.

Figure 6:
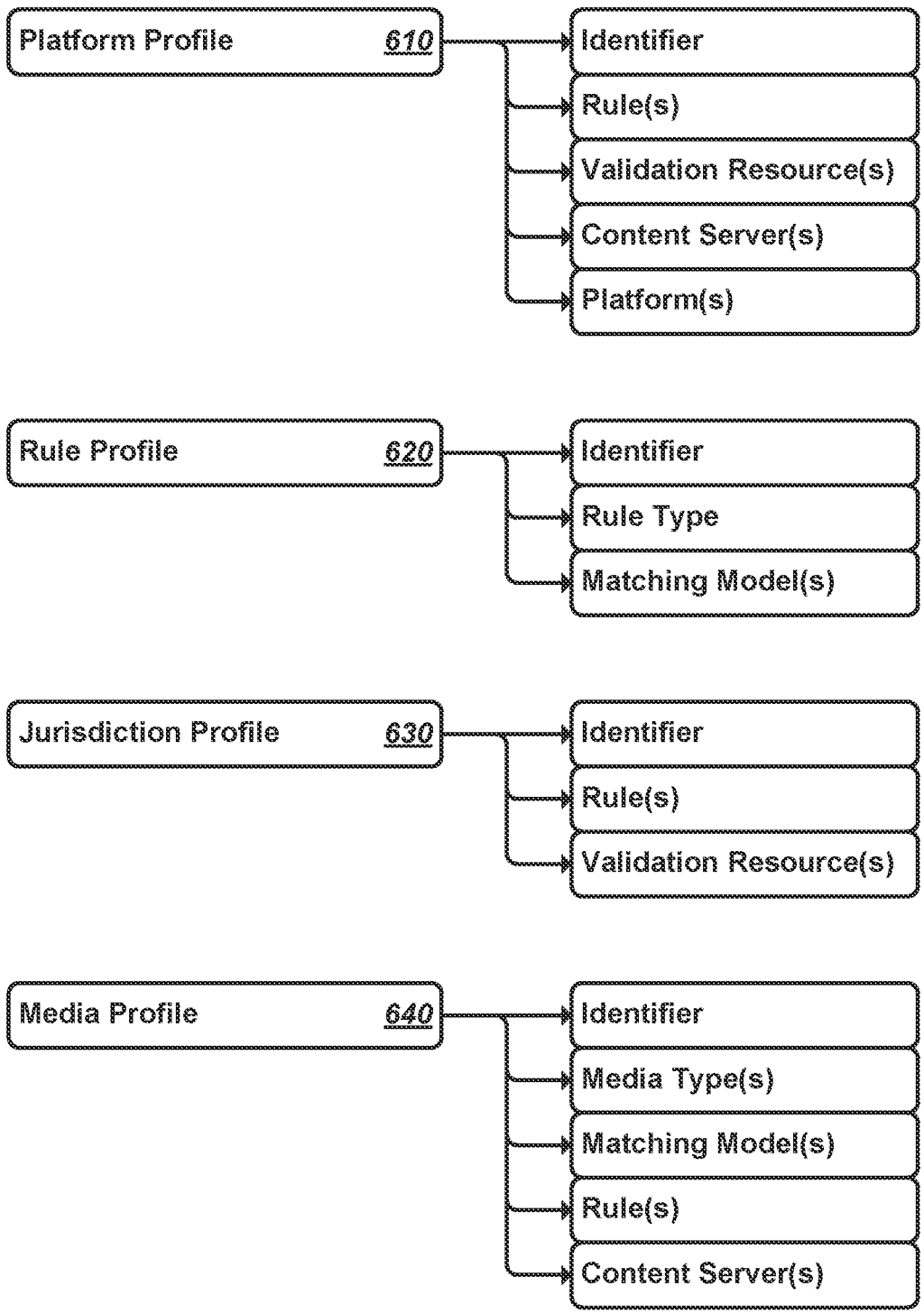
FIG. 6 illustrates a data structure diagram of various data structures associated with one or more embodiments described herein.

FIG. 6 illustrates a data structure diagram of one or more embodiments described herein, in which various profiles 610-640 are used to define and select assessment elements and features. In this example, the set of profiles includes a platform profile 610, a rule profile 620, a jurisdiction profile 630, and a media profile 640. Different embodiments may include various different types of profiles associated with various different sets of elements. For instance, some embodiments may include one or more media editor profiles associated with one or more media editors 170 or 520. As another example, some embodiments may include one or more source profiles associated with sources such as user accounts, social media groups, etc.

As shown, the platform profile 610 may include elements such as a unique identifier, a listing of associated rules, a listing of associated validation resources, a listing of associated content servers, a listing of associated platforms, and/or other appropriate elements. Such listings of associated elements may include, for instance, element identifiers, names, etc. that may be used to identify elements associated with a platform profile 610. Each platform profile 610 may be associated with a resource such as publishing platform 130 and/or publishing resource 510.

The rule profile 620 may include elements such as a unique identifier, a rule type (e.g., validation rule, jurisdiction rule, etc.), a set of matching models (e.g., machine learning or artificial intelligence models) that may be used to identify elements (e.g., media attributes, platform attributes, user attributes, jurisdiction attributes, etc.) that match a given rule profile 620 and associated rule, and/or other appropriate elements.

The jurisdiction profile 630 may include elements such as a unique identifier, a listing of associated rules, a listing of validation resources, and/or other appropriate elements. Each jurisdiction profile 630 may be associated with a publishing platform type (e.g., social media site, media hosting site, etc.), geographic region, governing body, and/or or other appropriate entities.

The media profile 640 may include elements such as a unique identifier, a listing of associated media types, a listing of associated matching models, a listing of associated rules, a listing of associated content servers, and/or other appropriate elements.

Such profiles may allow various entities, media types, etc. to be associated in various ways. For instance, a publishing platform 130 may be owned by a corporation headquartered in a particular geographic region. The associated platform profile 610 may indicate a set of associated rules, jurisdiction profiles, and validation resources that are appropriate for and/or indicated by the governing body or other entity associated with the particular geographic region.

As another example, a media profile 640 may be associated with a disputed claim or otherwise flagged content. Received media content that matches the profile may have various labelling rules applied (e.g., to indicate that a presented claim is disputed).

As another example, a platform profile 610 may include a listing of media items that may be published by users of the platform. Such a listing may include, for instance, media items expressing approval or disapproval with respect to a matter or topic. As another example, a listing may include media items associated with a set of qualified candidates for public office (e.g., a listing including at least one media item for each candidate meeting the qualifications to be listed on a ballot).

Figure 7:
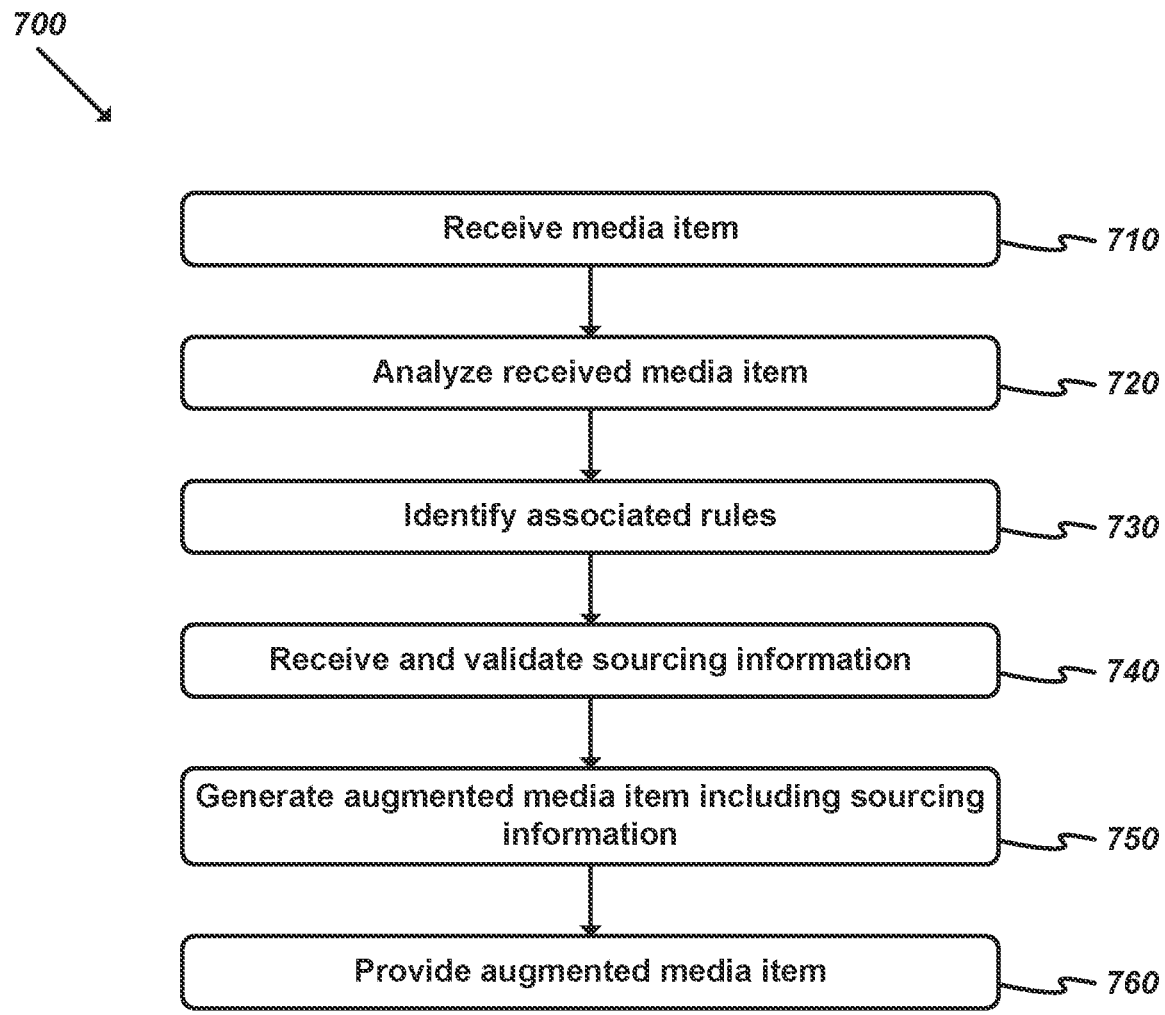
FIG. 7 illustrates a flow chart of an exemplary process that associates source information with a media item.

FIG. 7 illustrates an example process 700 for associating source information with a media item. The process may generate an augmented media item that includes content associated with the source information. Such source information may be verified or validated using various validation resources. The process may be performed, for instance, when a user uploads or otherwise submits a media item for publication to a platform. In some embodiments, process 700 may be performed by media sourcing engine 100.

As shown, process 700 may include receiving (at 710) a media item or a selection of a media item, such as media item 110. The media item or selection may be received via a resource such as user device 540 and/or publishing platform 510. In some embodiments, a resource such as media analyzer 150 may receive the media item. If the received media item includes an address such as a URL, the process may retrieve the media item from a storage or other resource (e.g., publishing platform 510 or content server 550).

Process 700 may include analyzing (at 720) the received media item. Such analysis may utilize various types of media item attributes or data, algorithms, etc. The analysis may be performed by a resource such as media analyzer 150. Analysis may include determining or identifying attributes such as media type (e.g., audio, video, graphics, etc.), content type (e.g., advertising content, political content, etc.), media source, etc. Analysis may include comparing the media item to various models in order to identify matching attributes (e.g., inclusion of adult content, political or election-related content, etc.). In some embodiments, matching models may include specific entities (e.g., a list of celebrities, politicians, businesses, etc.) and/or content (e.g., clips of public events, speeches, etc.) that may be associated with various profiles.

The process may include identifying (at 730) associated rules based on the media item analysis and/or other relevant factors (e.g., media item source, publishing platform, etc.). Various types of rules may be associated with various types of matching models, profiles, content types, regions or jurisdictions, other rules, etc. Rules may be identified by resources such as the validation engine 160, rules repository 180, and/or other appropriate resources.

As shown, process 700 may include receiving and validating (at 740) sourcing information based on the rules identified at 730. Such validation may be performed using resources such as validation engine 160, rules repository 180, validation resources 530, and/or other appropriate resources. As an example, users who would like to publish content to a social media site may be required to submit credit card information for verification via a payment processing resource (e.g., by charging a nominal fee to publish content).

Process 700 may include generating (at 750) an augmented media item that includes the validated sourcing information. The validated source information may include different levels of disclosure, depending on associated rules. For instance, in some cases the name of an individual user may be validated and included in the augmented media item. As another example, a username or other semi-anonymous label may be used to indicate sourcing information relative to a particular platform (e.g., a social media site). The augmented media item may include other content than sourcing information, such as required disclaimers associated with a particular jurisdiction. Depending on the type of media item received, various different types of content may be added to, embedded into, and/or otherwise combined with the received media item. For instance, an audiovisual clip including the augmented content may be added to a received audiovisual media item. As another example, a graphical overlay (e.g., a text overlay) with augmented content may be added to a still image. As yet another example, audio content may be added to an audio or audiovisual media item.

The process may include providing (at 760) the augmented media item. The augmented media item, such as augmented media item 120 may be provided via a file transfer, message indicating a file location or address, and/or other appropriate ways (e.g., by copying the augmented media item to a content server 550 or other appropriate resource).

Figure 8:
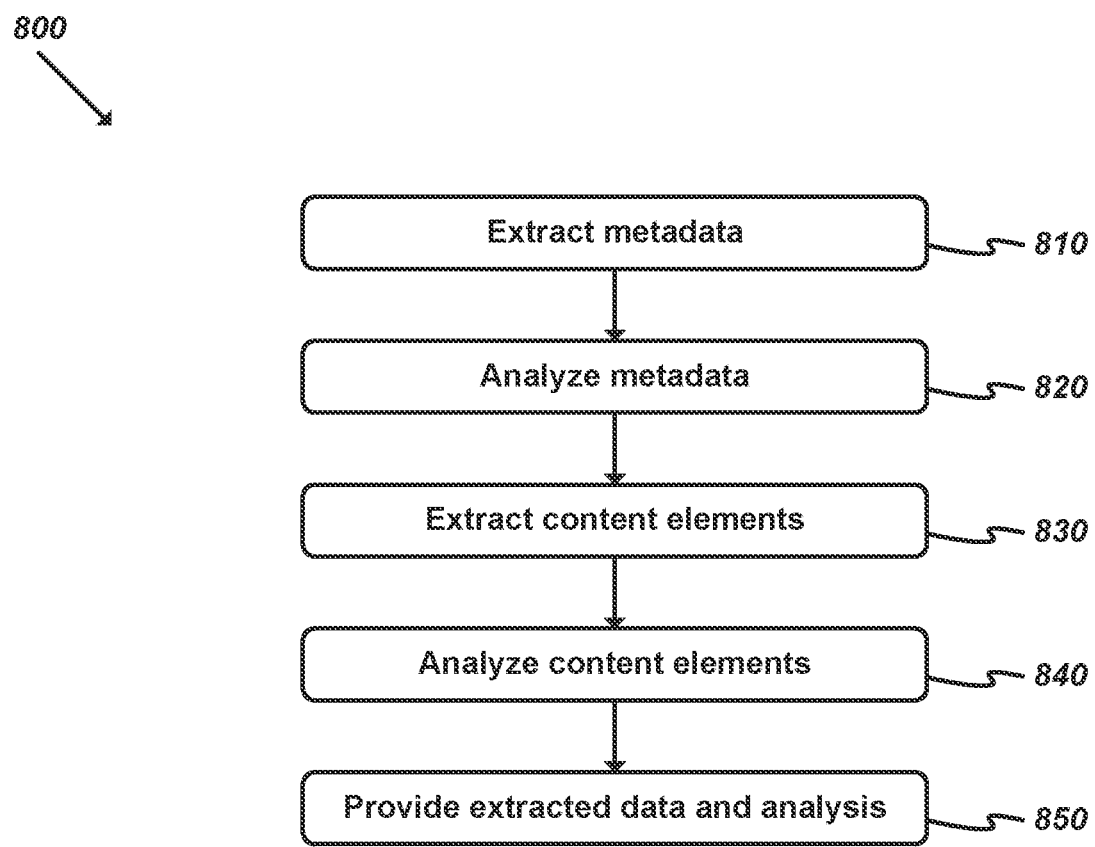
FIG. 8 illustrates a flow chart of an exemplary process that extracts and analyzes data associated with a media item.

FIG. 8 illustrates an example process 800 for extracting and analyzing data associated with a media item. The extracted and analyzed may be used for source validation, media item augmentation, rule identification or selection, etc. The process may be performed when a media item publication request is received. In some embodiments, operation 720 described above may include process 800. In some embodiments, process 800 may be performed by media sourcing engine 100 and/or a resource such as media analyzer 150.

As shown, process 800 may include extracting (at 810) metadata from the received media item. Such metadata and/or other information may be extracted from a header, such as header 140, associated with a received media file structure. Metadata or file information may be extracted in various appropriate ways depending on the file type, header type, etc. Such metadata may include information such as clip author, creation date, title, etc.

Process 800 may include analyzing (at 820) the received metadata information. Such analysis may include identifying relevant attributes, matching profiles, etc. In addition to, or in place of, metadata, various other data associated with a media item may be analyzed, such as file name, extension, creation date, modification date, etc.

The process may include extracting (at 830) content elements from the received media item. Such content extraction may include, for instance, extraction of video or audio data from an audiovisual file. As another example, overlaid text or graphics may be extracted from an audiovisual file. As still another example, scene or transition information may be extracted from a media item.

As shown, process 800 may include analyzing (at 840) the extracted content elements. Such analysis may include comparing the extracted content elements to various matching models. Different types of content may be analyzed in various different ways, as appropriate. For instance, audio content may be analyzed to identify speech and convert the speech to text for text-based analysis and matching. As another example, video content may be analyzed to identify strings of frames with consistent background or foreground graphics such that augmented content may be overlaid in areas that will promote visibility. As another example, audio content may be converted to text and the text may be compared to various matching terms, phrases, etc. Such an approach may be used to identify inappropriate or adult-themed content, to flag content with offensive language, etc.

Process 800 may include providing (at 850) the extracted data and analysis to other resources. For instance, data extracted by media analyzer 150 may be provided to resources such as validation engine 160 in order to identify relevant rules, or to resources such as media editors 170 for use in generating augmented content.

Figure 9:
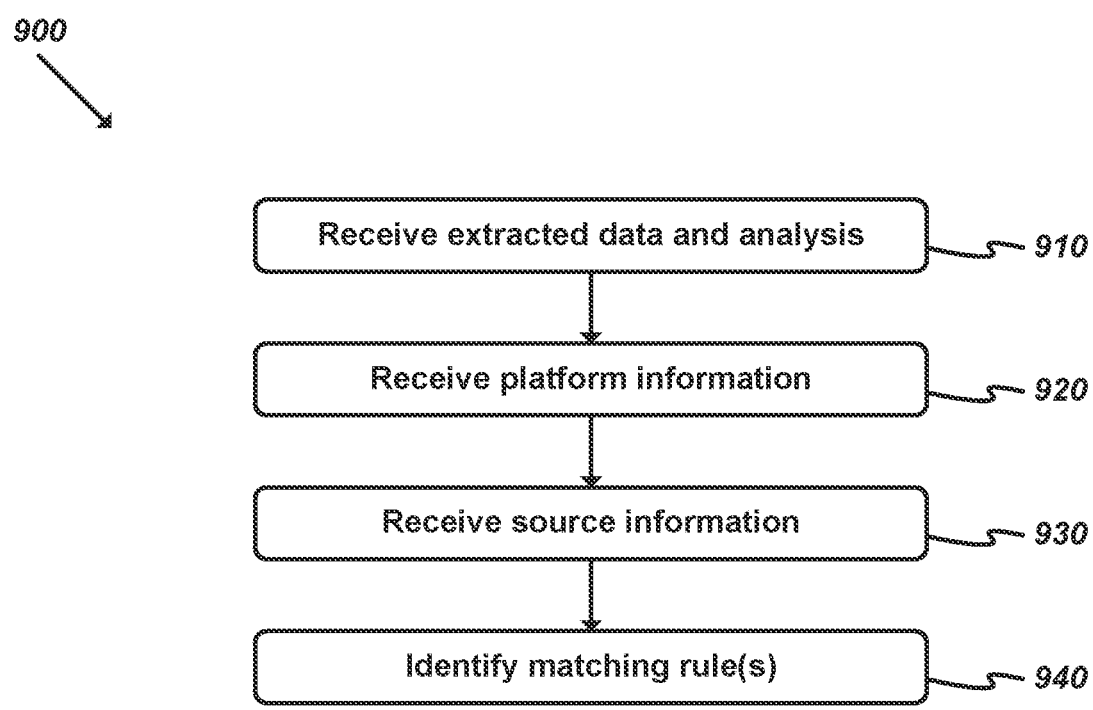
FIG. 9 illustrates a flow chart of an exemplary process that identifies rules associated with publication of a media item.

FIG. 9 illustrates an example process 900 for identifying rules associated with publication of a media item. The rules may be identified using resources such as profiles 610-640. The rules may specify sourcing and/or other requirements associated with publication of content. The process may be performed when received media has been analyzed or partially analyzed. In some embodiments, operating 730 described above may include process 900. In some embodiments, process 900 may be performed by media sourcing engine 100.

As shown, process 900 may include receiving (at 910) extracted data and analysis. Such data may be received from a resource such as media analyzer 150 and may include metadata, content data, extracted information, matching models, etc. Data may be extracted using a process such as process 800.

Process 900 may include receiving (at 920) platform information. Platform information may be received from a resource such as publishing platform 130, publishing resource 510, and/or other appropriate resources. Such information may include information such as an identifier of a platform profile 610. The platform profile 610 may include associated rules, matching models, other profiles, etc.

The process may include receiving (at 930) source information. Source information may be received from a resource such as publishing platform 130, publishing resource 510, user device 540, and/or other appropriate resources. Source information may include information related to a user account, personal information such as name, financial information such as credit card information, and/or other relevant source information. In some cases, source information may include a creator or author of the associated content, copyright owner or other such entity, a chain of publication sources, and/or other such information related to the publication history of a media item. Source information may include information related to an entity or person initiating a publication or republication of a media item.

As shown, process 900 may include identifying (at 940) matching rules and/or models. Such rules or models may be identified in various appropriate ways. For instance, a platform profile 610 associated with the publishing platform may include a listing of associated rules. As another example, a jurisdiction profile 630 associated with a geographic region may include a listing of applicable associated rules. As still another example, a media profile 640 associated with the received media type may include a listing of associated rules. Matching rules and/or models may be associated with other matching rules or models (e.g., by including a list of identifiers associated with such matching rules or models in a given matching rule or model). A resource such as a listing or table of matching rules (e.g., a listing of rule profile 620 identifiers) may be generated.

Figure 10:
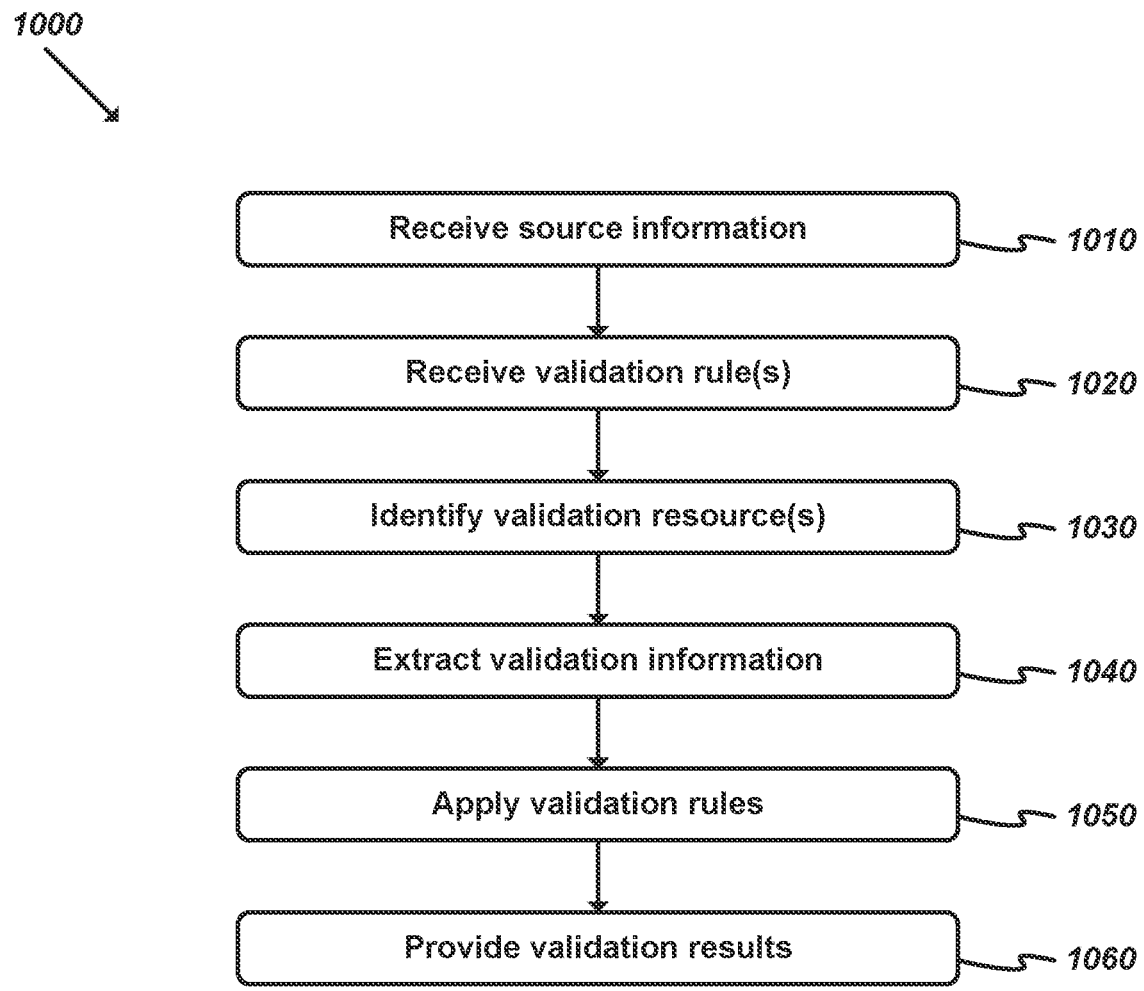
FIG. 10 illustrates a flow chart of an exemplary process that validates source information for a media item.

FIG. 10 illustrates an example process 1000 for validating source information for a media item. Such a process may validate or verify the identity of a source for a media item that is submitted or selected for publication. The process may be performed when a media item is submitted for publication. In some embodiments, operation 740 described above may include process 1000. In some embodiments, process 1000 may be performed by media sourcing engine 100, and, specifically, by a resource such as validation engine 160.

As shown, process 1000 may include receiving (at 1010) source information. A "source" may be any entity that provides a media item for publication. For example, a source may be a user of a publishing resource, a content creator, an organization or business entity, etc. In some embodiments, a source may be an electronic device such as a user device or server. Source information may be received from a resource such as publishing platform 130, publishing resource 510, user device 540, and/or other appropriate resources. Source information may be passed from a resource such as media analyzer 150 to a resource such as validation engine 160. Source information may include identity or identifying information (e.g., name, username, organization name, etc.), connection or device information (e.g., IP address, device serial number, etc.), and/or other appropriate information that may identify or define a source. Source information may be associated with, and/or include, validation or confirmation information (e.g., a credit card number, address, email address, a state-issued identification number such as a driver's license number, and/or other types of identity-validating information).

Process 1000 may include receiving (at 1020) validation rules. Validation rules may include various elements and/or criteria associated with source validation and/or other types of verification or validation. For instance, a rule associated with a social media site may require validation of user login information associated with the social media site. As another example, an upload to a media hosting site may require validation of a responsible individual through financial information such as a credit card.

The process may include identifying (at 1030) validation resources. In some embodiments, the received validation rules may include references to various associated validation resources. In some cases, a resource such as validation engine 160 may identify or select various resources based on a type of validation and/or other appropriate rule attributes. For instance, a set of credit card processing resources may be used to validate financial information, where the set of credit card processing resources may be indicated by a validation rule, a set of default resources associated with the media sourcing engine 100, a publishing platform profile 610, etc. As another example, validation resources may be identified based on geographical location of a source or publishing resource.

As shown, process 1000 may include extracting (at 1040) validation information. Validation information may be received at the validation engine 160 from a resource such as media analyzer 150. Validation information may be extracted or identified based on various associated rules, profiles, available validation resources, etc. For instance, if a validation rule indicates that a source's email must be verified, email information may be extracted from information received from the publishing platform 130. Continuing the example, if email information is not available or not able to be identified, the validation engine 160 and/or other appropriate resources may send a request for the information (e.g., by sending a request for source email address to the publishing platform 130).

Process 1000 may include applying (at 1050) validation rules. Application of validation rules may include, for instance, comparison of validation data to various evaluation criteria. For instance, a username and/or password may be matched to a database entry associated with a social media site user. As another example, financial and identifying information (e.g., credit card information, name and address of cardholder, etc.) may be submitted to a payment processing resource. As another example, a supplied email and/or name may be compared to various databases or other resources. As still another example, resources such as search engines may be used to validate public information. Validation rules may include various criteria for approval or denial of such validation based on the appropriate validation data. For instance, a response to a request for validation of username or password may include an indication of success or failure.

The process may include providing (at 1060) validation results. Validation results may be provided by a resource such as validation engine 160 to a resource such as media analyzer 150. Validation results may include, for instance, a discrete result indication (e.g., "success", "failure", etc.), a listing of validated information (e.g., name, username, email, etc.), a listing of validated information to include in augmented content (e.g., name of source, publishing platform, etc.), a listing of validation resources used to validate the information, a listing of rules and/or profiles used to perform the evaluation, and/or other relevant information.

In some cases, validation results may include information received from a resource such as a source or publishing platform 130, where the information is not examined or validated with respect to any other resource. For instance, if a request is received from a publishing platform 130 that indicates only the name of the publishing platform for source information, the received information may be included in an augmented media item without any verification or validation other than the indication provided by the requestor itself.

Figure 11:
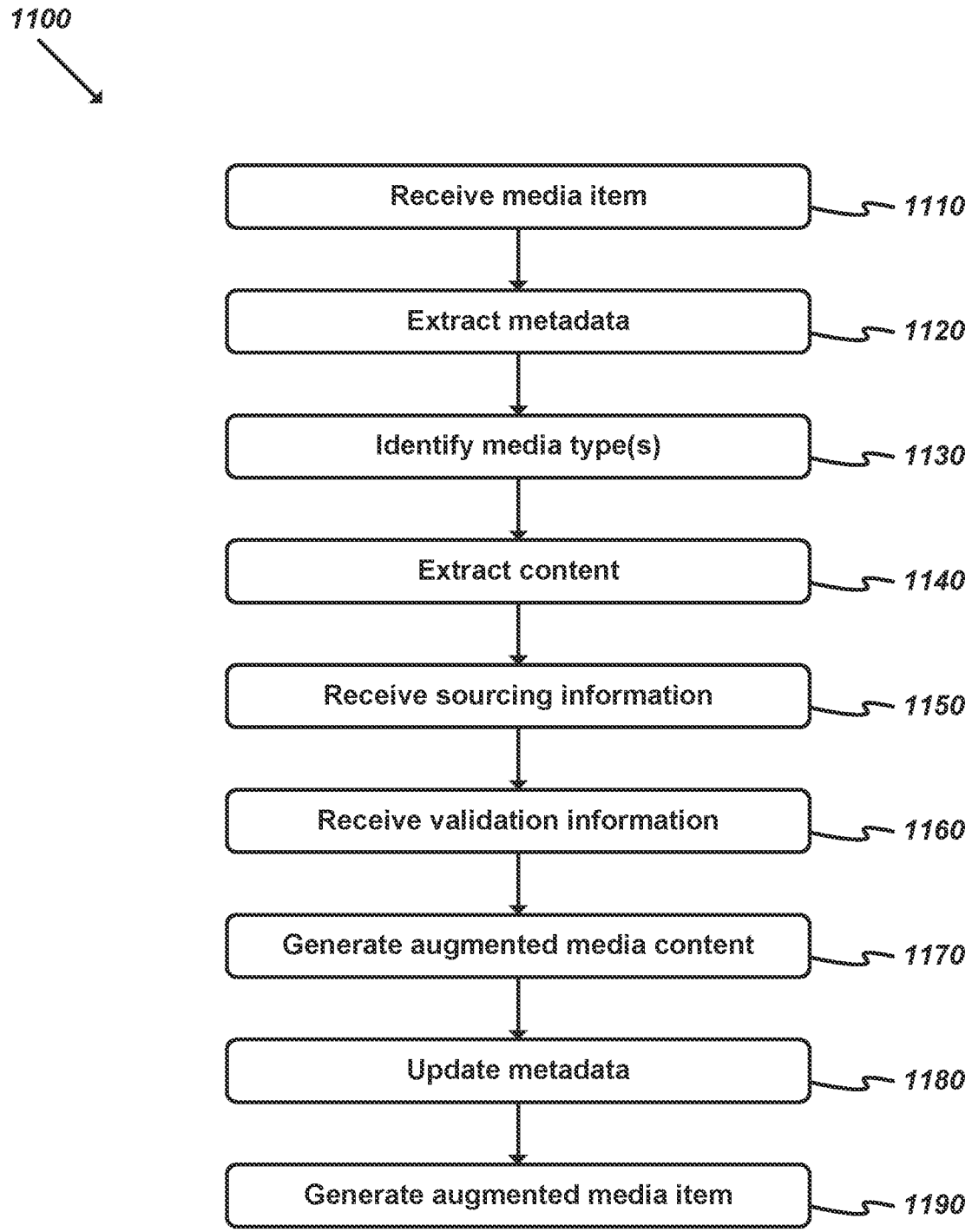
FIG. 11 illustrates a flow chart of an exemplary process that generates an augmented media item including source information.

FIG. 11 illustrates an example process 1100 for generating an augmented media item including source information. Such a process may be used to generate augmented content based on validated information and include the augmented content with content in a received media item, such as media item 110. The process may be performed after validation information is generated. In some embodiments, operation 750 described above may include process 1100. In some embodiments, process 1100 may be performed by media sourcing engine 100, and, specifically, by media analyzer 150 and/or media editors 170.

As shown, process 1100 may include receiving (at 1110) a media item. The media item, such as media item 110, may be received at a resource such as media editor 170. In some embodiments, various augmentation instructions may be received. Such augmentation instructions may include, for instance, augmented content type (e.g., audio, audiovisual, text overlay, etc.), augmented content data (e.g., validated source information, required disclaimers, etc.), and/or other appropriate information or instructions.

Process 1100 may include extracting (at 1120) metadata. Metadata may include any data associated with the received media item that is not considered media content. For example, metadata may include header information, such as header 140, file path information, file attributes, etc. Metadata may be extracted by a resource such as media analyzer 150.

The process may include identifying (at 1130) media types. Media type information may be identified or determined by a resource such as media analyzer 150. Media type information may include, for instance, file type (e.g., mp3, wav, mov, etc.), content type (e.g., audio, audiovisual, graphic, etc.), streaming or transmission protocol information, and/or other relevant information.

As shown, process 1100 may include extracting (at 1140) content. Content may be extracted in various appropriate ways, depending on various relevant factors, such as content type, augmentation type, validation data, etc. Content may be extracted by resources such as media analyzer 150 and/or media editor 170. For example, if a received media item, such as media item 110, includes audiovisual content, audio content data and video content data may be extracted. As another example, if augmented content includes only an audio disclaimer, audio data may be extracted.

Process 1100 may include receiving (at 1150) sourcing information. Such sourcing information may include validated and/or unvalidated information associated with a source of the received media item. Sourcing information may be provided in various appropriate formats (e.g., text, references or pointers, etc.).

The process may include receiving (at 1160) validation information. Validation information may include information such as validation type, a listing of validation resources, validation result, etc. Validation information may be received from a resource such as validation engine 160.

As shown, process 1100 may include generating (at 1170) augmented media content. Such augmented media content may include information such as source information, validation information, etc. Some embodiments may generate text-based augmented data (e.g., required disclaimers, source information, etc.) that may be converted into various formats, as appropriate. For instance, text may be converted to speech to generated augmented audio content. As another example, a text overlay or set of subtitles may be generated based on the text. In some embodiments, augmented media content may be generated using resources such as three-dimensional modeling and/or animation. For instance, audio content may be "presented" by an animated or rendered video avatar.

Process 1100 may include updating (at 1180) metadata. Depending on the file type and/or other relevant factors, updated file information may be added or associated in various appropriate ways. For instance, a header, such as header 140 may be updated to include additional and/or different information in a modified header 190. Updated metadata information may include, for instance, information related to source, validation, publisher, etc. In some embodiments, information such as previous sourcing or validation information may be extracted from metadata associated with a received media item and appended to current sourcing or validation information such that a sourcing "chain" is generated or maintained. In some embodiments, such information may include blockchain or other such crypto technology that may allow for the source information and/or other information to be embedded into or otherwise associated with an augmented media item, such as augmented media item 120.

The process may include generating (at 1190) an augmented media item. The augmented media item, such as augmented media item 120, may be generated in various appropriate ways, depending on the media item content type(s), augmented content type(s), and/or other relevant factors. Resources such as media editor 170 may generate and add augmented content to received content and/or modify received content to include augmented content.

Figure 12:
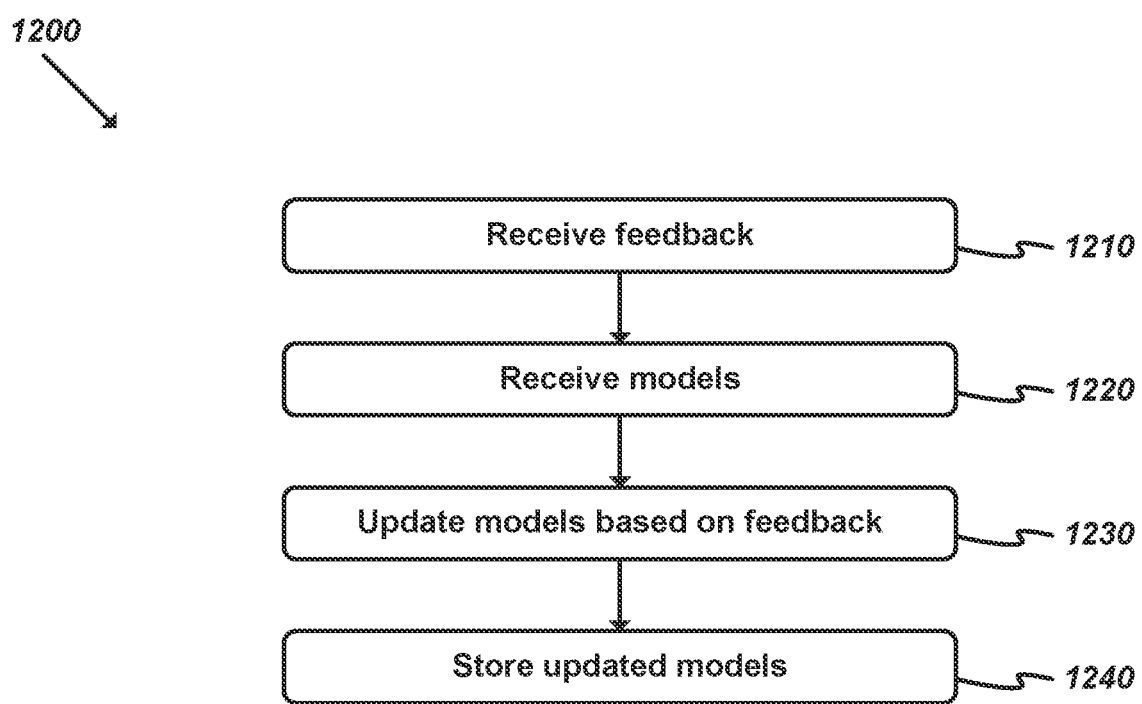
FIG. 12 illustrates a flow chart of an exemplary process that applies machine learning to models associated with media source information validation and association.

FIG. 12 illustrates an example process 1200 for applying machine learning to models associated with media source information validation and association. Such a process may be used to update models as feedback becomes available and/or additional content is processed. The process may be performed at regular intervals and/or other appropriate times. In some embodiments, process 1200 may be performed by media sourcing engine 100.

As shown, process 1200 may include receiving (at 1210) feedback. Feedback may be received in various ways from various appropriate sources. For example, users of a social media site may indicate whether appended information, such as sourcing information, was accurate and/or relevant. As another example, an administrator or regulator may review published content and indicate whether applicable publishing or reporting requirements were satisfied.

Process 1200 may include receiving (at 1220) available machine learning models. Based on the received feedback, relevant models may be identified and retrieved.

The process may include updating (at 1230) models and/or generating new models based on the received feedback. For instance, if a matching model is associated with positive feedback, the matching model may be weighted more heavily in analysis or made more likely to be associated with a profile. In contrast, if a matching model is associated with negative feedback, the matching model may be weighted less heavily in analysis or made less likely to be associated with a profile.

As shown, process 1200 may include storing (at 1240) the updated models. The updated or newly generated models may be stored for use in future analysis and machine learning.

One of ordinary skill in the art will recognize that processes 700-1200 may be implemented in various different ways without departing from the scope of the disclosure. For instance, the elements may be implemented in a different order than shown. As another example, some embodiments may include additional elements or omit various listed elements. Elements or sets of elements may be performed iteratively and/or based on satisfaction of some performance criteria. Non-dependent elements may be performed in parallel.

The processes and modules described above may be at least partially implemented as software processes that may be specified as one or more sets of instructions recorded on a non-transitory storage medium. These instructions may be executed by one or more computational element(s) (e.g., microprocessors, microcontrollers, digital signal processors (DSPs), application-specific integrated circuits (ASICs), field programmable gate arrays (FPGAs), other processors, etc.) that may be included in various appropriate devices in order to perform actions specified by the instructions.

As used herein, the terms "computer-readable medium" and "non-transitory storage medium" are entirely restricted to tangible, physical objects that store information in a form that is readable by electronic devices.

Figure 13:
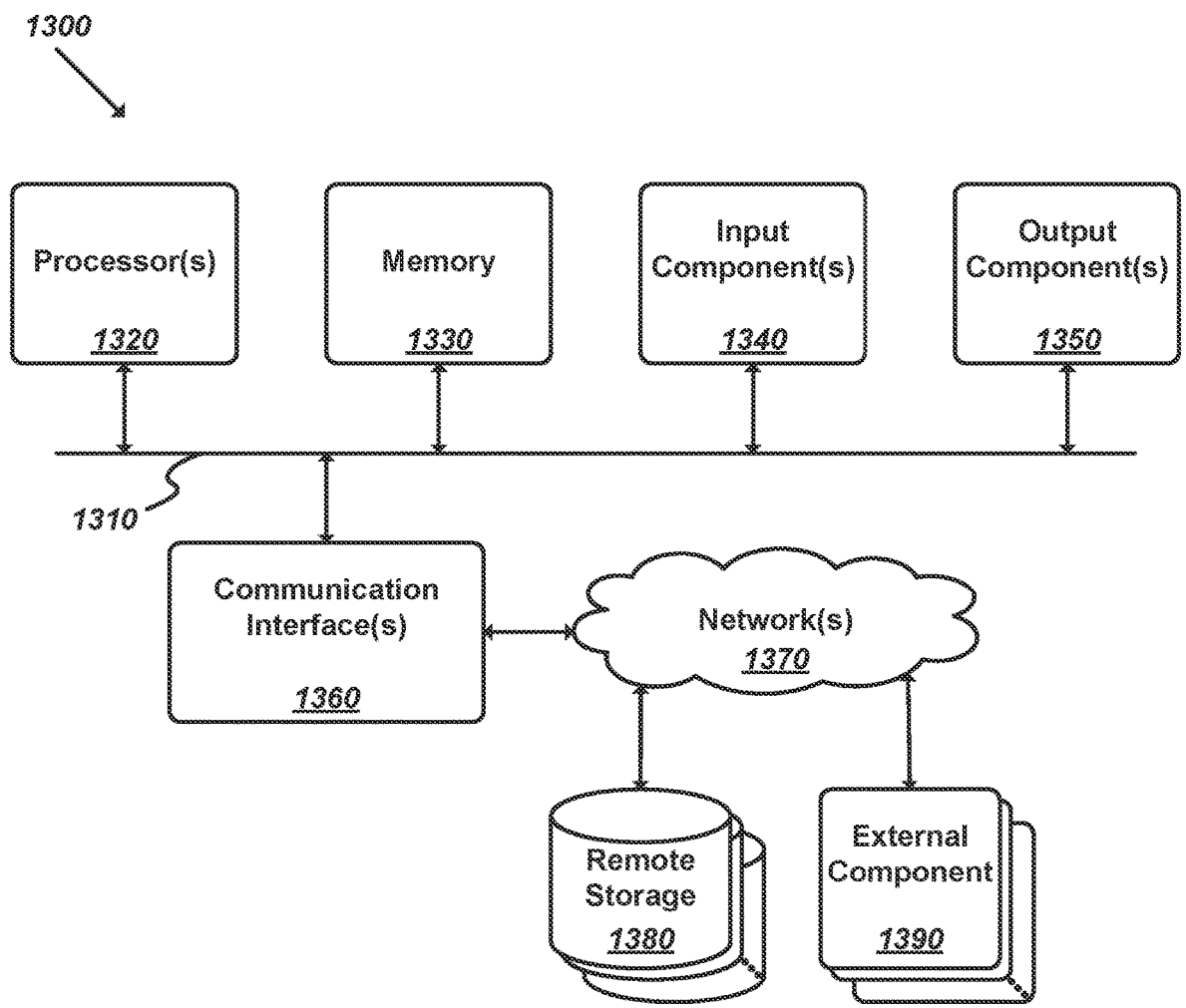
FIG. 13 illustrates a schematic block diagram of one or more exemplary devices used to implement various embodiments.

FIG. 13 illustrates a schematic block diagram of an exemplary device (or system or devices) 1300 used to implement some embodiments. For example, the environment described above in reference to FIG. 5 may be at least partially implemented using device 1300. As another example, the devices described above in reference to FIG. 1 and FIG. 5 may be at least partially implemented using device 1300. As still another example, the processes described in reference to FIG. 7, FIG. 8, FIG. 9, FIG. 10, FIG. 11, and FIG. 12 may be at least partially implemented using device 1300.

Device 1300 may be implemented using various appropriate elements and/or sub-devices. For instance, device 1300 may be implemented using one or more personal computers (PCs), servers, mobile devices (e.g., smartphones), tablet devices, wearable devices, and/or any other appropriate devices. The various devices may work alone (e.g., device 1300 may be implemented as a single smartphone) or in conjunction (e.g., some components of the device 1300 may be provided by a mobile device while other components are provided by a server).

As shown, device 1300 may include at least one communication bus 1310, one or more processors 1320, memory 1330, input components 1340, output components 1350, and one or more communication interfaces 1360.

Bus 1310 may include various communication pathways that allow communication among the components of device 1300. Processor 1320 may include a processor, microprocessor, microcontroller, digital signal processor, logic circuitry, and/or other appropriate processing components that may be able to interpret and execute instructions and/or otherwise manipulate data. Memory 1330 may include dynamic and/or non-volatile memory structures and/or devices that may store data and/or instructions for use by other components of device 1300. Such a memory device 1330 may include space within a single physical memory device or spread across multiple physical memory devices.

Input components 1340 may include elements that allow a user to communicate information to the computer system and/or manipulate various operations of the system. The input components may include keyboards, cursor control devices, audio input devices and/or video input devices, touchscreens, motion sensors, etc. Output components 1350 may include displays, touchscreens, audio elements such as speakers, indicators such as light-emitting diodes (LEDs), printers, haptic or other sensory elements, etc. Some or all of the input and/or output components may be wirelessly or optically connected to the device 1300.

Device 1300 may include one or more communication interfaces 1360 that are able to connect to one or more networks 1370 or other communication pathways. For example, device 1300 may be coupled to a web server on the Internet such that a web browser executing on device 1300 may interact with the web server as a user interacts with an interface that operates in the web browser. Device 1300 may be able to access one or more remote storages 1380 and one or more external components 1390 through the communication interface 1360 and network 1370. The communication interface(s) 1360 may include one or more APIs that may allow the device 1300 to access remote systems and/or storages and also may allow remote systems and/or storages to access device 1300 (or elements thereof).

It should be recognized by one of ordinary skill in the art that any or all of the components of computer system 1300 may be used in conjunction with some embodiments. Moreover, one of ordinary skill in the art will appreciate that many other system configurations may also be used in conjunction with some embodiments or components of some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

Device 1300 may perform various operations in response to processor 1320 executing software instructions stored in a computer-readable medium, such as memory 1330. Such operations may include manipulations of the output components 1350 (e.g., display of information, haptic feedback, audio outputs, etc.), communication interface 1360 (e.g., establishing a communication channel with another device or component, sending and/or receiving sets of messages, etc.), and/or other components of device 1300.

The software instructions may be read into memory 1330 from another computer-readable medium or from another device. The software instructions stored in memory 1330 may cause processor 1320 to perform processes described herein. Alternatively, hardwired circuitry and/or dedicated components (e.g., logic circuitry, ASICs, FPGAs, etc.) may be used in place of or in combination with software instructions to implement processes described herein. Thus, implementations described herein are not limited to any specific combination of hardware circuitry and software.

The actual software code or specialized control hardware used to implement an embodiment is not limiting of the embodiment. Thus, the operation and behavior of the embodiment has been described without reference to the specific software code, it being understood that software and control hardware may be implemented based on the description herein.

While certain connections or devices are shown, in practice additional, fewer, or different connections or devices may be used. Furthermore, while various devices and networks are shown separately, in practice the functionality of multiple devices may be provided by a single device or the functionality of one device may be provided by multiple devices. In addition, multiple instantiations of the illustrated networks may be included in a single network, or a particular network may include multiple networks. While some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items and may be used interchangeably with the phrase "one or more." Where only one item is intended, the terms "one," "single," "only," or similar language is used. Further, the phrase "based on" is intended to mean "based, at least in part, on" unless explicitly stated otherwise.

The foregoing relates to illustrative details of exemplary embodiments and modifications may be made without departing from the scope of the disclosure. Even though particular combinations of features are recited in the claims and/or disclosed in the specification, these combinations are not intended to limit the possible implementations of the disclosure. In fact, many of these features may be combined in ways not specifically recited in the claims and/or disclosed in the specification. For instance, although each dependent claim listed below may directly depend on only one other claim, the disclosure of the possible implementations includes each dependent claim in combination with every other claim in the claim set.

I claim:

1. A device, comprising: one or more processors configured to:
   receive a media item;
   extract media content from the media item;
   receive source indication information associated with a publisher of the media item;
   validate the received source indication information by:
      identifying a set of associated validation rules, the set of associated validation rules including an identity validation rule;
      identifying a set of associated validation resources, the set of associated validation resources including an identity validation resource;
      extracting validation information based on the received source indication information;
      applying the set of associated validation rules to validate the source indication information by:
         sending a request to at least one validation resource from the set of associated validation resources, wherein the at least one validation resource comprises the identity validation resource;
         receiving a validation message from the at least one validation resource; and
         applying at least one validation rule from the set of associated validation rules, the at least one validation rule comprising the identity validation rule;
   generate augmented media content that includes the source indication information; and
   generate and store an augmented media item that includes the augmented media content and the extracted media content by appending audio content to the media item, and
   wherein the validation rules comprise a rule that requires indication of sourcing information,
   wherein the audio content comprises the required indication of sourcing information, and
   wherein the indication of sourcing information is embedded with the media item via blockchain.

2. The device of claim 1, wherein the media item comprises audio content, audiovisual content, or graphic content.

3. The device of claim 1, wherein the augmented media content comprises audio content, audiovisual content, text-based content, or graphic content.

4. The device of claim 1, wherein the identity validation resource is a payment processing resource, a social media site, a search engine, or an email account provider.

5. The device of claim 4, wherein generating augmented media content based on the source information comprises generating text-based validation information based on the received validation message.

6. The device of claim 5, wherein generating augmented media content based on the source information further comprises converting the text-based validation information to audio content.

7. The device of claim 6, wherein the source information comprises at least one of a name, username, email address, or publishing platform.

8. A non-transitory computer-readable medium, storing a plurality of processor executable instructions to:
   receive a media item;
   extract media content from the media item;
   receive source indication information associated with a publisher of the media item;
   validate the received source indication information by:
      identifying a set of associated validation rules, the set of associated validation rules including an identity validation rule;
      identifying a set of associated validation resources, the set of associated validation resources including an identity validation resource;
      extracting validation information based on the received source indication information;
      applying the set of associated validation rules to validate the source indication information by:
         sending a request to at least one validation resource from the set of associated validation resources, wherein the at least one validation resource comprises the identity validation resource;
         receiving a validation message from the at least one validation resource; and
         applying at least one validation rule from the set of associated validation rules, the at least one validation rule comprising the identity validation rule;
   generate augmented media content that includes the source indication information; and generate and store an augmented media item that includes the augmented media content and the extracted media content by appending audio content to the media item, and wherein the validation rules comprise a rule that requires indication of sourcing information, wherein the audio content comprises the required indication of sourcing information, and wherein the indication of sourcing information is embedded with the media item via blockchain.

9. The non-transitory computer-readable medium of claim 8, wherein the media item comprises audio content, audiovisual content, or graphic content.

10. The non-transitory computer-readable medium of claim 8, wherein the augmented media content comprises audio content, audiovisual content, text-based content, or graphic content.

11. The non-transitory computer-readable medium of claim 8, wherein the validation rules comprise a first rule that requires user verification and a second rule that requires indication of sourcing information.

12. The non-transitory computer-readable medium of claim 11, wherein generating augmented media content based on the source information comprises generating text-based validation information based on the received validation message.

13. The non-transitory computer-readable medium of claim 12, wherein generating augmented media content based on the source information further comprises converting the text-based validation information to audio content.

14. The non-transitory computer-readable medium of claim 13, wherein the source information comprises at least one of a name, username, email address, or publishing platform.

15. A method comprising:
receiving a media item;
extracting media content from the media item;
receiving source indication information associated with a publisher of the media item;
validating the received source indication information by:
identifying a set of associated validation rules, the set of associated validation rules including an identity validation rule;
identifying a set of associated validation resources, the set of associated validation resources including an identity validation resource;
extracting validation information based on the received source indication information;
applying the set of associated validation rules to validate the source indication information by:
sending a request to at least one validation resource from the set of associated validation resources, wherein the at least one validation resource comprises the identity validation resource;
receiving a validation message from the at least one validation resource; and
applying at least one validation rule from the set of associated validation rules, the at least one validation rule comprising the identity validation rule;
generating augmented media content that includes the source indication information; and
generating and storing an augmented media item that includes the augmented media content and the extracted media content by appending audio content to the media item, and
wherein the validation rules comprise a rule that requires indication of sourcing information,
wherein the audio content comprises the required indication of sourcing information, and
wherein the indication of sourcing information is embedded with the media item via blockchain.

16. The method of claim 15, wherein the media item comprises audio content, audiovisual content, or graphic content.

17. The method of claim 15, wherein the augmented media content comprises audio content, audiovisual content, text-based content, or graphic content.

18. The method of claim 15, wherein generating augmented media content based on the source information comprises generating text-based validation information based on the received validation message.

19. The method of claim 15, wherein:
generating augmented media content based on the source information further comprises converting the text-based validation information to audio content, and
the source information comprises at least one of a name, username, email address, or publishing platform.

\* \* \* \* \*